(No Model.)
H. C. WIRT.
ELECTRIC RAILWAY CAR.
No. 421,464.      Patented Feb. 18, 1890.
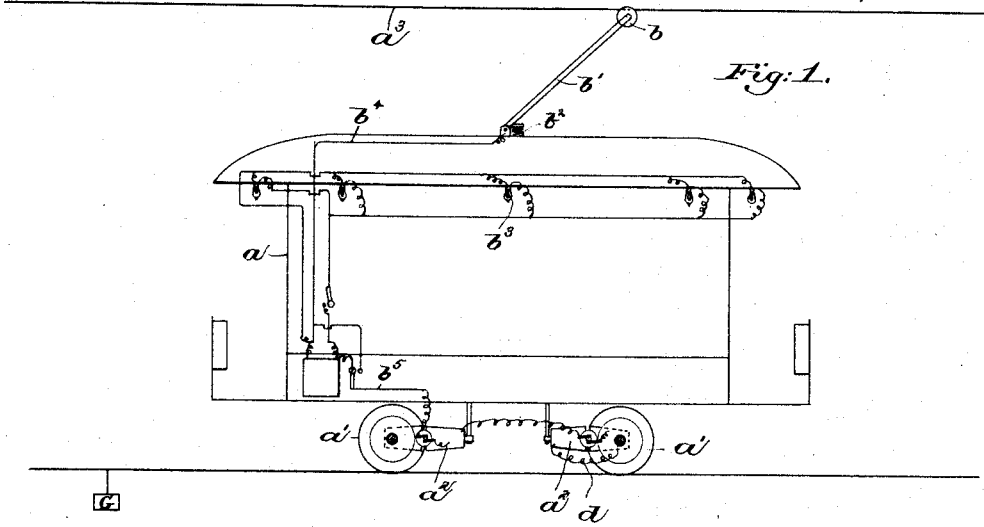
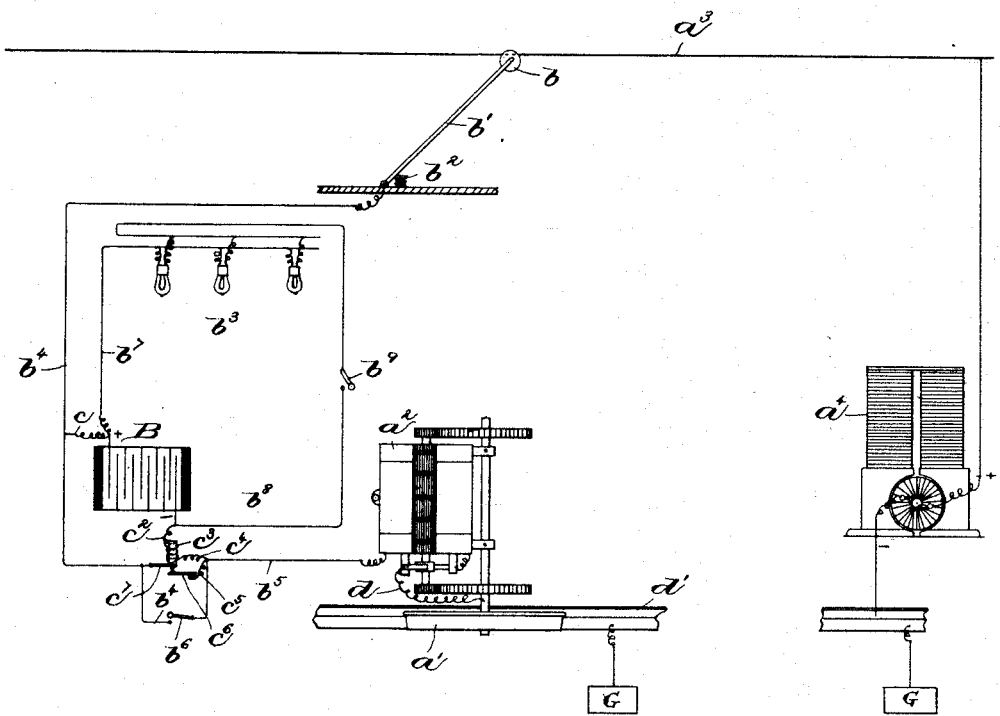
Witnesses.
Howard F. Eaton.
Fred S. Greenleaf
Inventor:
Herbert C. Wirt.
by Crosby & Gregory
Attys.

UNITED STATES PATENT OFFICE.

HERBERT C. WIRT, OF BOSTON, MASSACHUSETTS.

ELECTRIC-RAILWAY CAR.

SPECIFICATION forming part of Letters Patent No. 421,464, dated February 18, 1890.

Application filed January 19, 1889. Serial No. 296,871. (No model.)

*To all whom it may concern:*

Be it known that I, HERBERT C. WIRT, of Boston, county of Suffolk, State of Massachusetts, have invented an Improvement in Electric-Railway-Car Lighting, of which the following description, in connection with the accompanying drawings, is a specification, like letters on the drawings representing like parts.

Electric-railway cars or vehicles as now commonly constructed and known to me are lighted by means of incandescent lamps included in a branch circuit from the main line or circuit in which is located the electromotor carried by the car. The circuits of the motor and lamps are completed in what is known as the "overhead system" by means of a trolley-wheel running in contact with a main line or conductor suspended above the car, and in what is known as the "conduit system" the circuit is completed by a plow, or it may be a trolley-wheel carried by the car and located in the conduit, where it makes contact with the conductors located in said conduit. In practice it frequently happens that the trolley or plow during the passage of the car over the road fails to make contact with the main conductor, thus breaking the lamp-circuit at that point and extinguishing the lamps, leaving the car in darkness. So, also, if the car leaves or jumps the track, the circuit of the lamps is broken, extinguishing the lamps until the car has been replaced upon the tracks and the circuit of the lamps completed by contact of the trolley or plow with the main conductor. Furthermore, the lamps are extinguished when the car is at rest, as the trolley or plow at such time is not in contact with the main conductor.

It is the object of this invention to obviate this disagreeable feature of our present system of lighting electric-railway cars, and I accomplish my object by including in series with the motor a storage-battery and connecting the lamps in multiple arc with the storage-battery, the said lamps being in series with the motor, substantially as will be described.

Figure 1 shows in outline an electric-railway car embodying my invention, the said car being supplied with electricity from a conductor located above the car; and Fig. 2, a diagram of circuits to more clearly illustrate my invention.

The car $a$, mounted upon a truck provided with wheels $a'$, and supporting, as shown, two electromotors $a^2$, may be of any usual or well-known construction such as now commonly employed on street-railways. The motors $a^2$ are supplied with electricity from a main conductor $a^3$, connected to a dynamo $a^4$, as herein shown, by means of a trolley-wheel $b$, mounted on an arm $b'$, pivoted or hinged on top of the car, the said trolley-wheel being maintained in connection with the main conductor $a^3$ by a spring $b^2$ in usual manner.

The car $a$ is provided, as shown, with a number of incandescent electric lamps $b^3$, which may be arranged in multiple arc, as herein shown, or they may be connected in series, they being preferably connected in multiple arc. The trolley-arm $b'$ is connected to the motors by the wires $b^4$ $b^5$, joined by a switch $b^6$.

In order that the current may be supplied to the lamps at all times, a storage-battery B is connected in series with the motor, it having one wire, as $b^7$, of a branch circuit in which the lamps are located connected to one of its poles or terminals, as the positive pole, and the other branch wire, as $b^8$, connected to the other pole or terminal of the said battery, one of the branch wires, as $b^8$, being provided with a switch, as $b^9$, for a purpose to be hereinafter described. The positive pole of the battery B is also joined, as by wire $c$, to the positive wire $b^4$, and the negative pole of the said battery is connected, as shown, by wire $c^2$ to a magnet, or it may be a solenoid $c^3$, having its other wire $c^4$ joined to the wire $b^5$, the latter being also connected by wire $c^5$ to a contact-arm $c^6$, with which co-operates the armature $c^7$ of the magnet $c^3$.

As shown in Fig. 2, the switches $b^6$ $b^9$ are open and the circuit of the motor is completed through the battery B and magnet $c^3$, and the said battery is being charged, which may be supposed to take place in the day-time. When the battery has been sufficiently charged, the switch $b^6$ may be closed to complete the direct circuit through the wires $b^4$ $b^5$, the battery and lamp-circuit being shunted out.

When it is desired to light the lamps, as in the night-time, the switch $b^9$ is closed and the switch $b^6$ opened. The circuit is then through the lamps to the motor, it being traced as follows—viz., from the main conductor $a^3$ by trolley-wheel $b$ and arm $b'$, wires $b^4$ $c$ to battery B, thence by wire $b^7$, lamps $b^8$, wire $b^9$ to the magnet $c^3$, through the said magnet-wire $b^5$ to motor, and thence through the motor to the ground by wire $d$, car-wheel $a'$, and rail $d'$.

The battery B, it will be noticed, is included in series with the motor, but is in multiple arc with the lamp, and in practice the normal current required by the motor—such, for example, as twenty ampères—will pass through the lamps and motor; but if for any reason a greater current is supplied to the motor—say, twenty-five ampères—the excess of five ampères will pass into the battery and charge the same.

When the circuit of the motor is broken at the conductor—as, for instance, when the car is at rest or the trolley or plow fails to connect with the main conductor in the movement of the car—the lamps are supplied with current from the storage-battery.

While the battery B is in use the armature $c^7$ is withdrawn from contact with the arm $c^6$; but in case of accident to the said battery the armature will make contact with the arm $c^6$ and complete the motor-circuit.

It will be noticed that the battery B not only serves to supply current to the lamps, but also serves to regulate the light of the same by taking up excess of current, thus preventing injury to the said lamps.

I have herein shown the motor carried by the car as supplied with electricity from an overhead conductor; but it may be supplied from a conductor located in a conduit.

I claim—

1. The combination, with an electric-railway car or vehicle, an electric motor carried thereby, and a main conductor exterior to the car, of one or more lamps connected in series circuit with the main conductor and the motor, and a storage-battery carried by the car and having one pole connected to the main conductor, to be charged thereby, and its other pole connected with the motor, the circuit of the said lamps being in multiple arc with the said storage-battery charged by the current from the main conductor, substantially as described.

2. The combination, with an electric-railway car or vehicle, an electric motor carried thereby, and a main conductor exterior to the car, of one or more lamps connected in series circuit with the main conductor and the motor, and a storage-battery carried by the car and having one pole connected to the main conductor, to be charged thereby, and its other pole connected with the motor, the circuit of the said lamps being in multiple arc with the said storage-battery charged by the current from the main conductor, a switch in the lamp-circuit, and a second switch in the motor-circuit, substantially as described.

3. The combination, with an electric-railway car or vehicle, an electric motor carried thereby, and a main conductor exterior to the car, of one or more lamps connected in series circuit with the main conductor and the motor, and a storage-battery carried by the car and having one pole connected to the main conductor, to be charged thereby, and its other pole connected with the motor, the circuit of the said lamps being in multiple arc with the said storage-battery charged by the current from the main conductor, and an electro-magnet connected to the storage-battery and controlling a switch in the motor-circuit, substantially as described.

In testimony whereof I have signed my name to this specification in the presence of two subscribing witnesses.

HERBERT C. WIRT.

Witnesses:
JAS. H. CHURCHILL,
HOWARD F. EATON.